No. 696,230. Patented Mar. 25, 1902.
W. I. FIELDING.
FAUCET CONNECTION.
(Application filed Nov. 6, 1901.)
(No Model.)
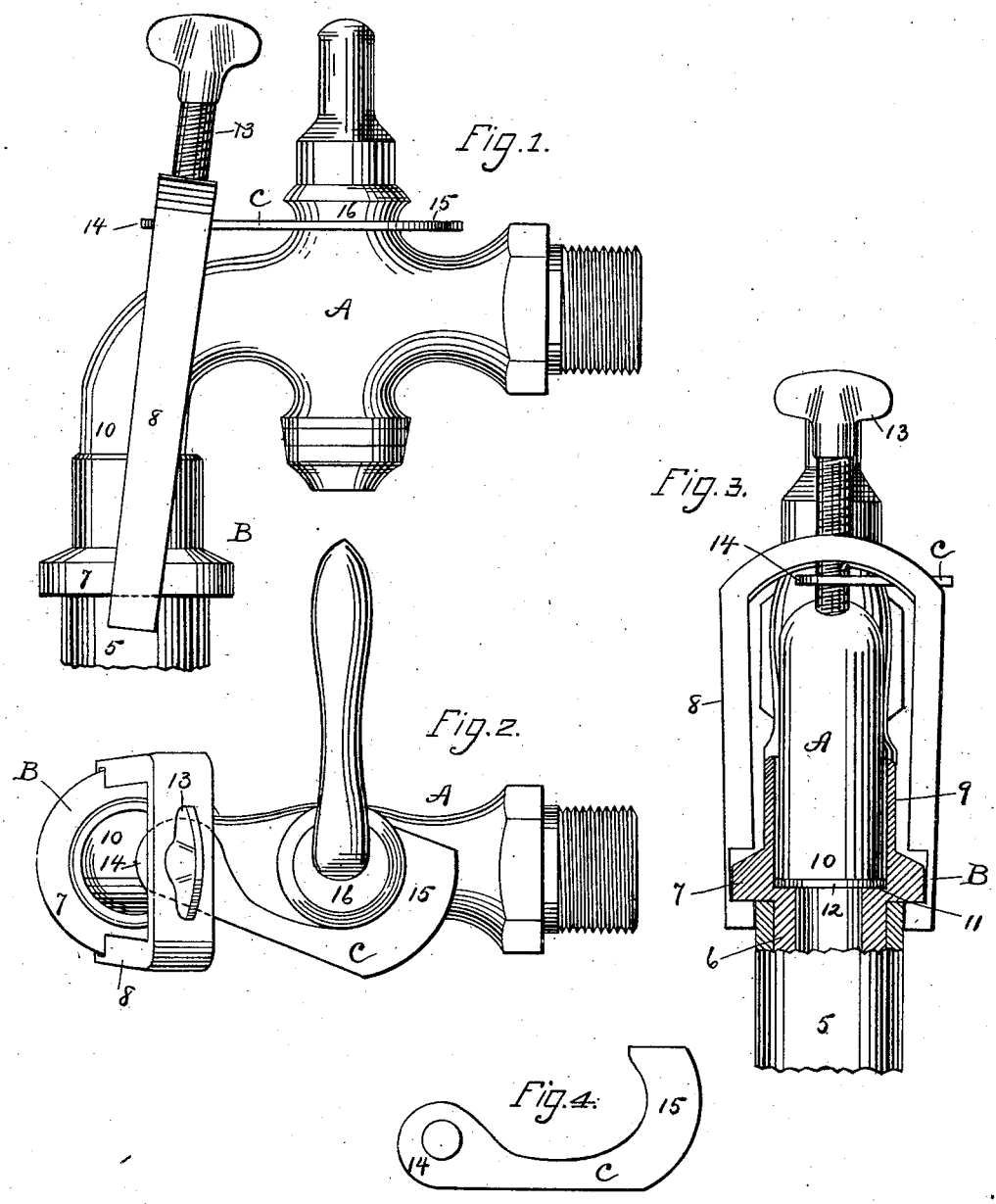
Witnesses.
S. H. Clarke
H. D. Humphrey
Inventor.
William I. Fielding.
By James Shepard.
Atty.

UNITED STATES PATENT OFFICE.

WILLIAM I. FIELDING, OF NEW BRITAIN, CONNECTICUT, ASSIGNOR OF ONE-HALF TO LOUIS SCHWAB, OF ATLANTIC CITY, NEW JERSEY.

FAUCET CONNECTION.

SPECIFICATION forming part of Letters Patent No. 696,230, dated March 25, 1902.

Application filed November 6, 1901. Serial No. 81,279. (No model.)

*To all whom it may concern:*

Be it known that I, WILLIAM I. FIELDING, a citizen of the United States, residing at New Britain, in the county of Hartford and State of Connecticut, have invented certain new and useful Improvements in Faucet Connections, of which the following is a specification.

My invention relates to improvements in faucet connections; and the main object of my improvement is to conveniently connect a hose with a nibless faucet.

In the accompanying drawings, Figure 1 is a side elevation of my connection as applied to an ordinary nibless faucet. Fig. 2 is a plan view of the same; Fig. 3, a front elevation, and Fig. 4 a detached plan view of the holding-link belonging to the said connection.

A designates the ordinary faucet; B, the special coupling attached to the end of a hose 5. This coupling is provided with an ordinary neck 6 for attaching it to the end of the hose 5 in any ordinary manner, also with a flange 7 for the application of the yoke 8, and above this flange is provided with a tubular portion 9 to receive the threadless end 10 of the faucet. At the base of the tubular portion there is a seat 11 for the packing-washer 12, as shown in Fig. 3. The yoke is mainly in the form of an inverted U, with the confronting faces of the legs near their ends notched to receive the flange 7 of the coupling, as shown, while the bridge at the upper end of the said yoke is bored and threaded to receive the set-screw or clamping-screw 13. Owing to the usual curve of the faucet above its delivery end, the set-screw cannot be depended upon to hold the yoke in place unless some means is provided to prevent the set-screw from working down the incline on the front of this curved portion. I therefore employ the holding-link C, which is provided with an eye 14 at one end to receive the body of the set-screw and with a hook 15 at the other end for hooking around the upright neck 16 of the faucet.

It will be seen without further explanation that this connection can be readily and efficiently applied to an ordinary nibless faucet.

While I prefer to provide a special coupling B as more convenient and efficient, it is evident that the same yoke, set-screw, and holding-link may be used for securing a hose with the ordinary screw-threaded coupling attached thereto to the faucet.

I claim as my invention—

1. The herein-described faucet connection, consisting of the yoke for engaging the coupling, the set-screw for drawing the said yoke and coupling toward the faucet, and the holding-link at the upper end of the yoke, substantially as described.

2. The combination of the special coupling having the flange and upper tubular projection, with the yoke engaging the said coupling, the set-screw for drawing up the yoke and coupling against the lower end of the faucet, and the holding-link for holding the upper end of the yoke in place, substantially as described.

WILLIAM I. FIELDING.

Witnesses:
JAMES SHEPARD,
SHEFFIELD CLARKE.